(12) United States Patent
Goodson (10) Patent No.: US 6,553,081 B1
(45) Date of Patent: Apr. 22, 2003

(54) METHOD AND APPARATUS FOR REMOVING DC FROM THE OUTPUT OF A PRECODER IN A TRANSMITTER OF A DATA COMMUNICATION SYSTEM

(75) Inventor: Richard L. Goodson, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 0 days.

(21) Appl. No.: 09/400,625

(22) Filed: Sep. 20, 1999

Related U.S. Application Data
(60) Provisional application No. 60/132,937, filed on May 6, 1999.

(51) Int. Cl.[7] .......................... H04K 1/02; H04L 25/03; H04L 25/49
(52) U.S. Cl. ........................................ 375/296; 327/307
(58) Field of Search ................................ 375/286, 287, 375/295, 296, 233; 327/307

(56) References Cited

U.S. PATENT DOCUMENTS

| | | | |
|---|---|---|---|
| 5,162,812 A | 11/1992 | Aman et al. | 375/34 |
| 5,249,200 A | 9/1993 | Chen et al. | 375/58 |
| 5,388,124 A | 2/1995 | Laroia et al. | 375/17 |
| 5,394,440 A | 2/1995 | Goldstein et al. | 375/265 |
| 5,488,633 A | 1/1996 | Laroia | 375/262 |
| 5,513,216 A | 4/1996 | Gadot et al. | 375/233 |
| 5,559,561 A | 9/1996 | Wei | 348/470 |
| 5,796,535 A * | 8/1998 | Tuttle et al. | |
| 6,469,851 B1 * | 10/2002 | Ashley et al. | 360/46 |

* cited by examiner

Primary Examiner—Jean Corrielus
(74) Attorney, Agent, or Firm—Thomas, Kayden, Horstemeyer & Risley, L.L.P.

(57) ABSTRACT

A method and apparatus for driving the DC output of a precoder in the transmitter of a data communication system to zero after the end of a scheduled transmission of data include the use of a DC canceling circuit in a feedback arrangement with the precoder to drive the DC output of the precoder and of the transmitter circuits associated therewith to zero.

16 Claims, 8 Drawing Sheets

METHOD AND APPARATUS FOR REMOVING DC FROM THE OUTPUT OF A PRECODER IN A TRANSMITTER OF A DATA COMMUNICATION SYSTEM

PRIORITY APPLICATION

This application claims priority to United States Provisional Application Ser. No. 60/132,937 filed on May 6, 1999, entitled "A Method and Apparatus for Removing DC From the Output of a Precoder in a Transmitter of a Data Communication System."

FIELD OF THE INVENTION

This application relates to telecommunication systems, such as data communication systems, and, more specifically, to a method and apparatus for canceling a direct current (DC) signal component from the output of a precoder in a transmitter of such systems at a preselected or predetermined time, e.g., after the scheduled transmission of data. The precoder and associated circuits of the present invention incorporate a modulo device and a DC tracking and cancellation circuit for driving the DC value of the output of the precoder to zero after a preselected or predetermined time, e.g., after a scheduled transmission of data. The precoder thereby provides a means for reducing or eliminating the adverse effects that a residual DC value at the precoder output at the end of a scheduled transmission has upon subsequent data transmission in the system.

BACKGROUND OF THE INVENTION

It is well known by those skilled in the telecommunication art that the performance of a data communication system can be significantly improved by using Tomlinson precoding ("preceding"). Typically, precoding eliminates much of the distortion caused by the transmission channel coupling a transmitter to a receiver. Although there are alternatives to precoding, such as use of a decision feedback equalizer (DFE), precoding has advantages in certain data communication systems, particularly when precoding is used in conjunction with coding schemes such as trellis coded modulation (TCM), since the absence of error propagation will result in a more reliable operation of realizable soft-decision decoders.

In conventional data communication systems, an apparatus for precoding ("precoder") is typically provided and initialized during a training mode when a training signal is sent from a transmitter to a receiver having a DFE. During the training mode, DFE coefficients are generated in the receiver and then transferred back to the associated transmitter via a conventional return channel or back channel. The transferred DFE coefficients are then placed in the precoder's feedback filter. The transferred coefficients are typically referred to as precoder coefficients or precoder taps.

The precoder in a data communications system receives a data coded signal, e.g., an input data symbol or digital symbol sequence, and converts the data coded signal into the precoder's output, which comprises a precoded data coded signal or output data symbol or digital symbol sequence. The input data symbol sequence can be generated by use of a variety of conventional modulation methods, such as pulse amplitude modulation (PAM), quadrature amplitude modulation (QAM), carrierless AM/PM modulation (CAP), discrete multi-tone (DMT) and other methods known to those skilled in the telecommunications art. The precoded output signal conventionally passes through a digital-to-analog converter, a shaping filter, and other transmitter circuits, thereby obtaining a transmitter output signal for transmission on the channel.

It is desirable in some data communications systems for the output of the transmitter to have a low DC component, preferably zero, at a predetermined time after a scheduled transmission of a data coded signal. One type of data communication system requiring the output of the transmitter to have a DC value of zero after such predetermined time is a time division duplex (TDD) data communication system. This requirement has heretofore precluded the use of conventional precoding in TDD systems, because a conventional precoder, and therefore the transmitter output, typically includes a non-zero DC value after such predetermined time. Hence, there is a need for an apparatus and method for completely canceling the DC component at the output of a precoder after such predetermined time.

Further, it is desirable for such an apparatus to be easily implemented within the existing structure of a transmitter so as to require no changes in the operation of the associated receiver.

SUMMARY OF THE INVENTION

The principal object of the present invention is to provide a means for driving the DC output component of a precoder to zero at a predetermined time, such as, after the end of a scheduled transmission of a data coded signal. By driving the precoder's DC output component to zero, the DC output component of the transmitter's line drivers is also driven to zero. Hence, in accordance with the present invention, a TDD data communication system requirement that a precoding transmitter have a DC output of zero, after a scheduled data transmission, is satisfied by driving the precoder's DC output value to zero at that time.

Another object of the present invention is to provide a means for driving the precoder's DC output component to zero with little change in the precoder structure, thereby minimizing the need for additional hardware and software.

A further object of the present invention is to provide an apparatus and method that drives the precoder's DC output component to zero without producing a large transient.

Yet another object of the invention is to provide a DC canceller or compensator for a precoder, which during a scheduled transmission of data continually provides a DC compensation signal for driving the precoder's DC output component to zero.

An apparatus and method described in the preferred embodiment meets the above and other objects.

In accordance with the present invention, a method is provided for driving the DC output of a precoder in a data communication system to zero at a predetermined time after a scheduled transmission of data. The method includes the steps of: generating a data symbol sequence d(n); subtracting the output f(n) of a precoder filter from the data symbol sequence d(n) to form an adjusted data symbol a(n); adding a level shifting signal r(n) to the adjusted data symbol sequence a(n) to form a level shifted (modulo) data symbol sequence b(n); adding a DC compensation signal q(n) to the data symbol b(n) to obtain an adjusted modulo signal m(n); determining a running sum s(n) of the adjusted modulo signal m(n); setting the value of an output signal p(n) to the value of the adjusted modulo signal m(n) until the predetermined time; and setting the value of the output signal p(n) to the negative value of the running sum s(n−1) at the predetermined time.

In another aspect of the present invention, a precoder for use in a transmitter of a data communication system is provided having a modulo device for receiving an adjusted data symbol sequence that is based on an input data symbol sequence and for generating a modulo signal, and a circuit coupled to the modulo device for driving the DC output of the precoder to zero at a predetermined time. The circuit coupled to the modulo device includes: a compensator summer for adding the modulo signal and a compensation signal thereby obtaining an adjusted modulo signal; a compensator means for generating the compensation signal, the compensator means incorporating an integrator for obtaining a running sum of the adjusted modulo signal; and an insertion switch programmed to selectively set the output of the precoder to be the adjusted modulo signal prior to a predetermined time and, at the predetermined time, to set the output of the precoder to be the negative value of the running sum.

Further objects, features and advantages of the invention will become apparent from the following detailed description taken in conjunction with the accompanying figures showing illustrative embodiments of the invention.

BRIEF DESCRIPTION OF THE DRAWINGS

For a complete understanding of the present invention and the advantages thereof, reference is now made to the following description taken in conjunction with the accompanying drawings in which like reference numerals indicate like features and wherein.

DETAILED DESCRIPTION OF THE PREFERRED EMBODIMENT(S)

Figure 1:
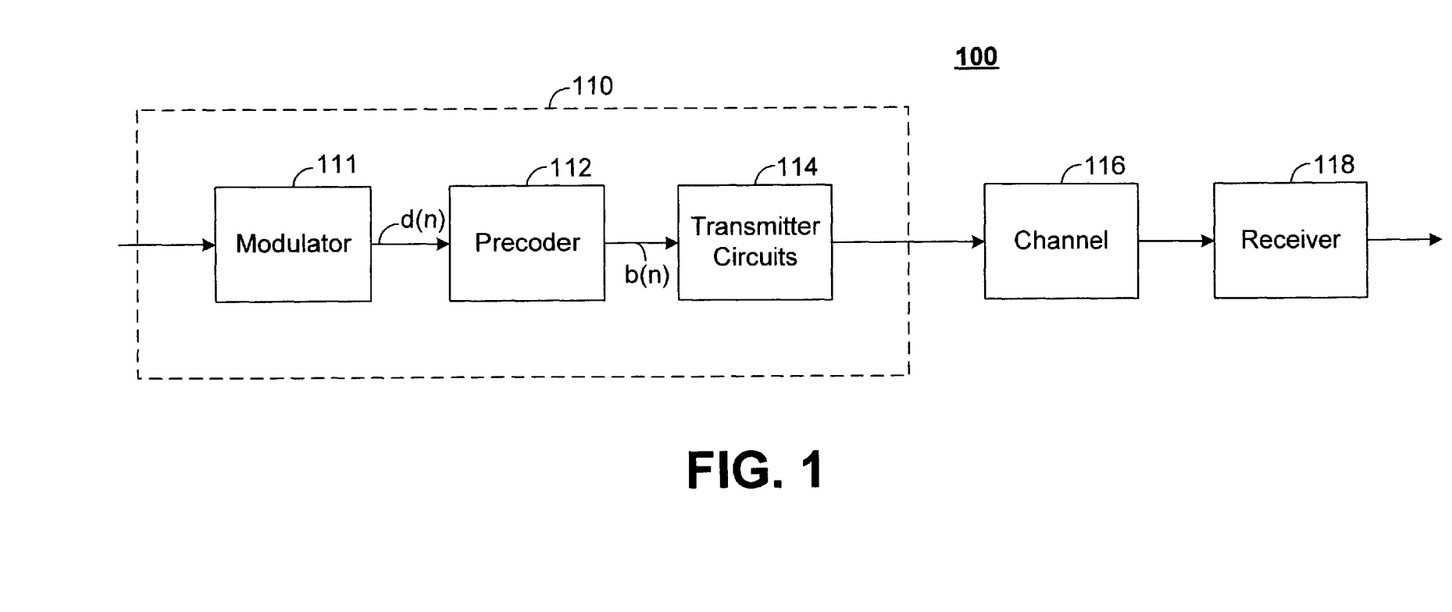
FIG. 1 illustrates a conventional data communication system.

Referring to FIG. 1, a conventional data communication system 100 has a channel 116 for conveying signals generated by a transmitter 110 to a receiver 118. The transmitted signal can be a data modulated signal generated by using conventional modulation methods such as PAM, QAM, or CAP. The specific details of the transmitter 110, channel 116, and receiver 118 are not shown but are known and understood by those skilled in the telecommunication art.

In FIG. 1, a transmitter 110 is shown as incorporating a modulator 111, which sends a data symbol sequence d(n) to a precoder 112. The output data symbol sequence b(n) of the precoder 112 is coupled to transmitter circuits 114 for processing and transmission thereof via channel 116 to receiver 118.

A conventional practice in the art is to employ the precoder 112 as a means for compensating for some of the channel impairments to be experienced by data signals transmitted via the channel 116. The precoder 112 receives and processes the data symbol sequence d(n), thereby generating an output signal data symbol sequence b(n), which is coupled to the input of the transmitter circuits 114. The precoder's DC output signal value, at a sample time n, is the sum of the DC output values from $-\infty$ to n. This summing process in the discrete time domain is equivalent to integration in the continuous time domain.

The transmitter circuits 114 typically process the output data symbol sequence b(n) for transmission over the channel 116. After the end of a scheduled transmission of data, the transmitter 110 is turned off. It is then desirable in some data communication systems to drive the DC component of the precoder output to zero after the end of the scheduled transmission.

Figure 2:
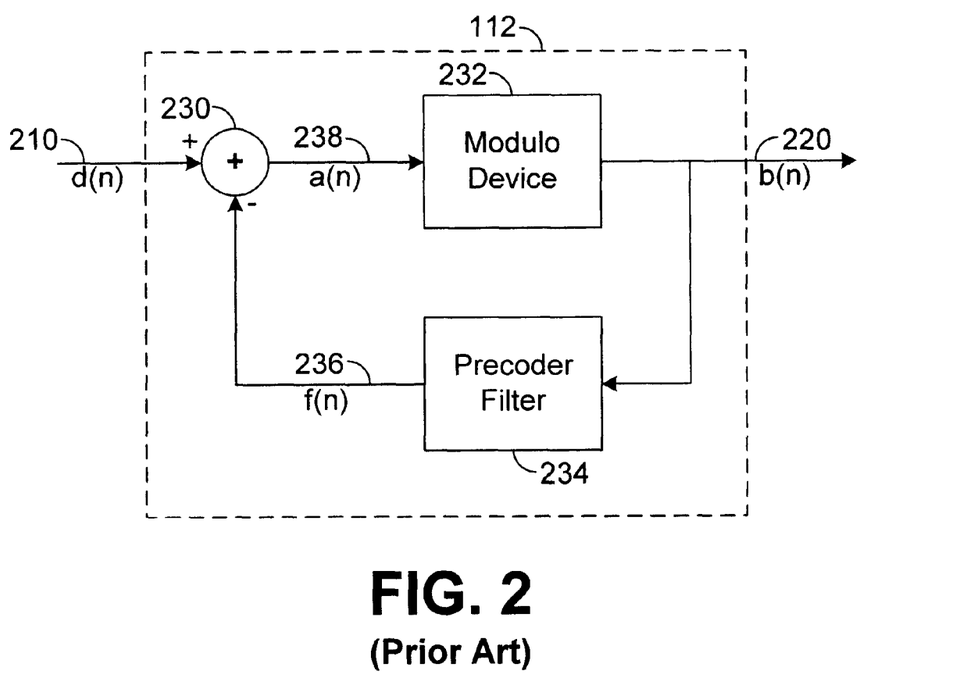
FIG. 2 illustrates a prior art precoder structure.

FIG. 2 illustrates a conventional prior art precoder 112 having a means for limiting the peak values of the output signal b(n). Referring to FIG. 2, a precoder filter 234 is typically an FIR filter and has precoder coefficients selected to effect cancellation of at least some of the channel impairments to the data signal during transmission via the channel 116. The precoder coefficients for the precoder filter 234 are generated in the receiver 118 while the system is operated in a training mode. The coefficients are sent back to the transmitter via a conventional return channel (not shown) before the system goes into a data transmission mode. The data symbol sequence d(n) is combined by summer 230 with the output 236 of the precoder filter 234, a filtered data symbol sequence f(n), to form an adjusted data symbol sequence a(n). A modulo device 232 receives data symbol sequence a(n) and generates therefrom a precoded data symbol sequence b(n) at the precoder's output 220.

It is well-known in the telecommunications art that a modulo operation in mathematics is similar to, but is not the same as, the modulo operation of a conventional modulo device 232. The modulo device 232 typically has an output with limits between $-K$ and $+K$ and generates an output in accordance with one or more of a variety of known algorithms.

Figure 3:
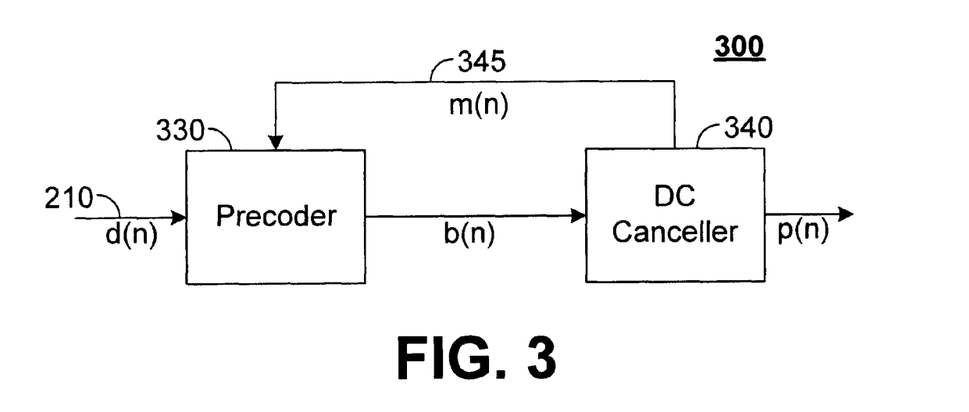
FIG. 3 illustrates in block diagram format of a preferred embodiment of an apparatus for use in a data communication system in accordance with FIG. 1 for driving the precoder's DC output value to zero at a predetermined time.
Figure 4:
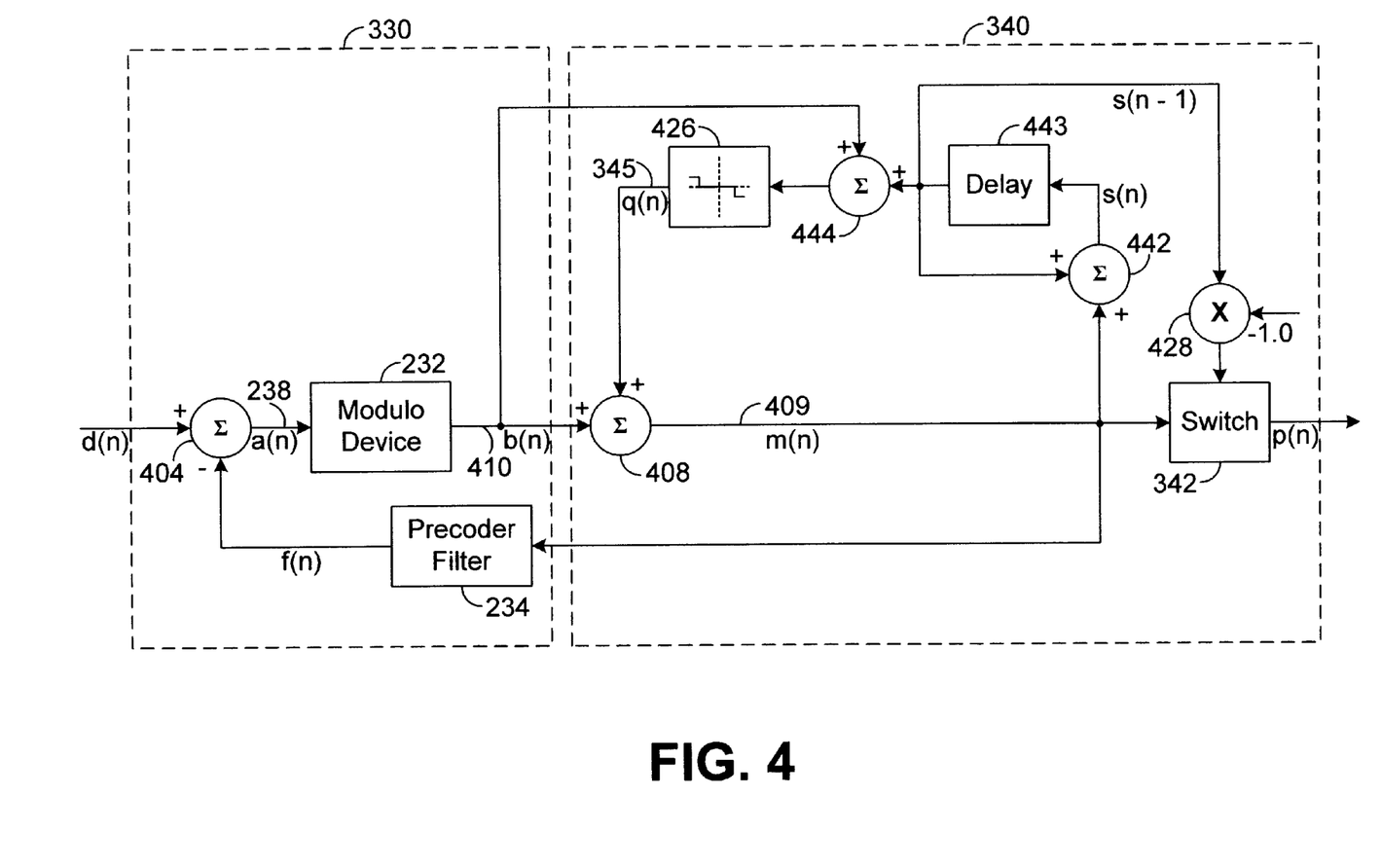
FIG. 4 illustrates details of the embodiment illustrated in FIG. 3.

FIG. 3 illustrates a precoder 330, which in accordance with the present invention, is modified and is employed with a DC canceller 340. The DC canceller 340 supplies a DC compensation signal sequence q(n), as shown by FIG. 4. The signal q(n) can take on negative, zero or positive values. In one embodiment of the present invention, the compensation signal q(n) has values of $-2K$, 0, or $+2K$ as determined by a compensation algorithm illustrated in FIG. 7.

Referring to FIG. 4, the DC canceller 340 has an insertion switch 342 for setting the output signal p(n) in accordance with the value of an adjusted modulo signal m(n). The insertion switch 342 is preferably implemented in software, or a combination of hardware and software, in accordance with the switching algorithm described in FIG. 6. For all values of n from $-\infty$ to $n_f$, the switch 342 sets p(n) equal to m(n). At a predetermined time corresponding to the time index $n_f+1$, or any suitable time after the completion of a scheduled transmission, e.g., $n_f+1$, $n_f+2$, etc., the switch 342 sets p(n) equal to the negative value of the running sum s(n−1) of the adjusted modulo output m(n), thereby effectively forcing the DC value of p(n) to zero at the predetermined time.

Figure 9:
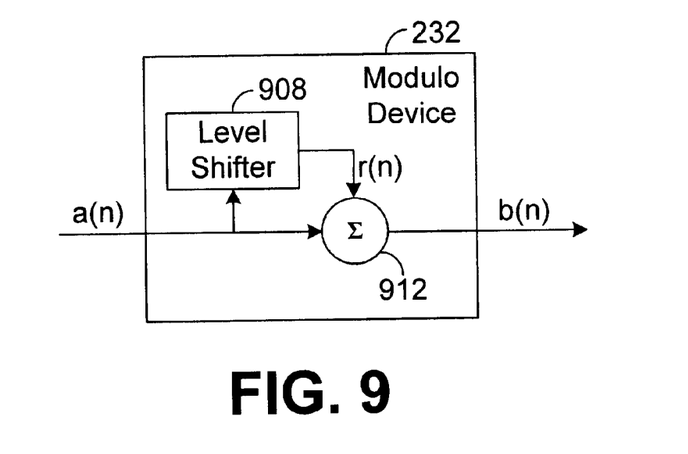
FIG. 9 illustrates details of a modulo device depicted in FIG. 4.

Again referring to FIG. 4, the filtered signal sequence f(n) is subtracted from the data symbol sequence d(n) by the filter summer 404 producing an adjusted data symbol sequence 238, i.e., sequence a(n). The adjusted data symbol sequence a(n) is then supplied to a level shifter 908 (FIG. 9) and to a modulo summer 912 incorporated in the modulo device 232. The resulting output 410 is a level-shifted data symbol sequence (modulo signal) b(n). The output sequence r(n) of the level shifter 908 is also supplied to the modulo summer 912. The level shifter serves as a means for providing the modulo operation used in conventional practice in precoders. If it is desired for the output of the modulo summer to be contained in the range [−K, K], then even multiples of K are added to or subtracted from the symbol sequence a(n).

Figure 10:
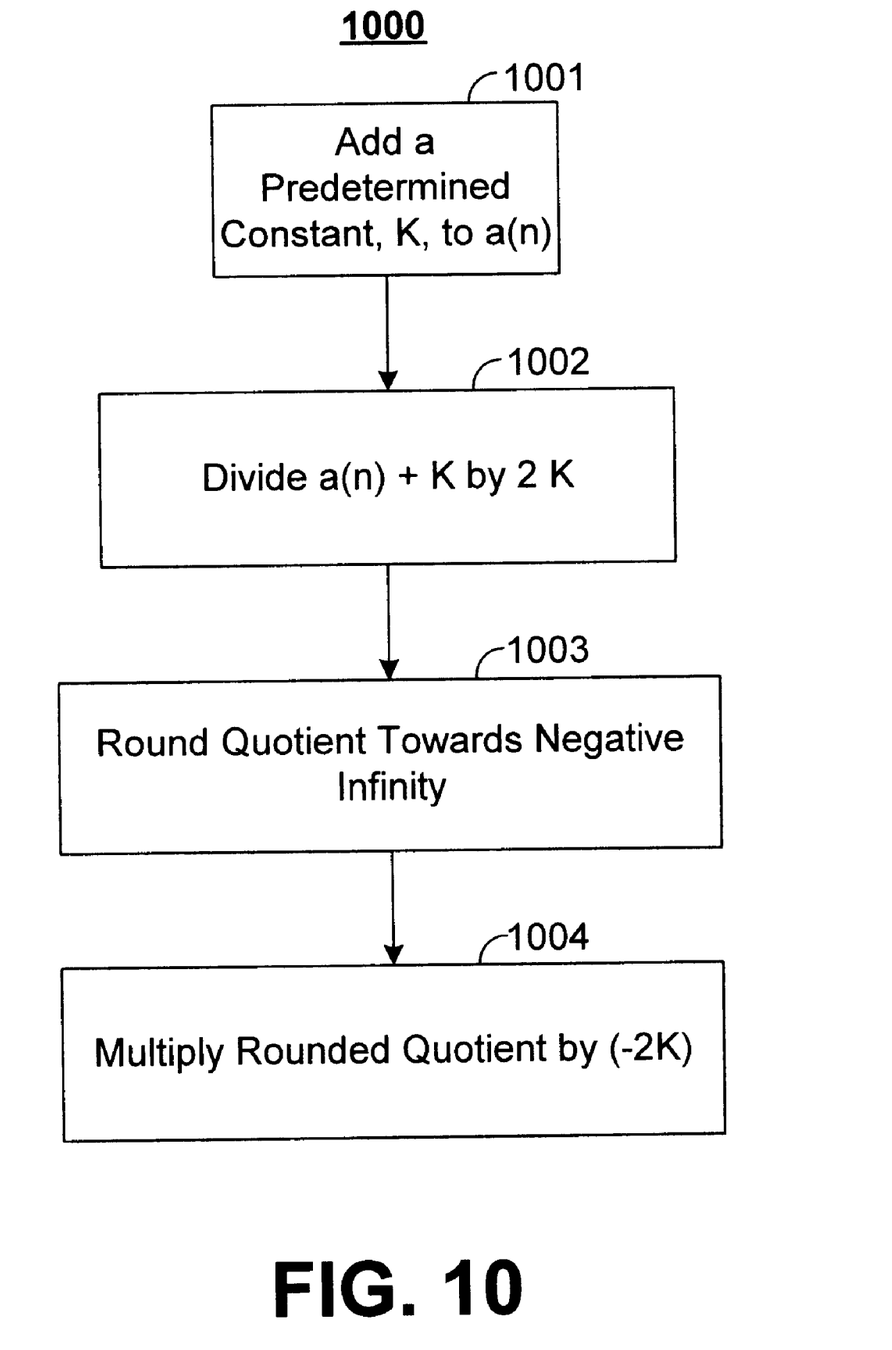
FIG. 10 is a flow chart illustrating steps for determining a level shifting signal in accordance with the present invention.

In accordance with the present invention, an algorithm for determining the value of r(n) is based upon the floor function, "floor(x)". The floor function is a round down function, which can produce a positive or a negative integer. For example, if x is 4.3, then floor (4.3) is 4; if x is −0.5, then floor (−0.5) is −1, and if x is 0.5, then floor (0.5) is 0. If x is (a(n)+K)/(2K), then r(n) is −1.0* floor (x) *2K. Note that blocks 1001–1004 in method 1000 of FIG. 10 depict such an algorithm for determining r(n).

Referring again to FIG. 4, a compensator summer 408 adds the compensation signal sequence q(n) to the level-shifted signal sequence b(n). The output 409 of the compensator summer 408 is the desired adjusted modulo signal sequence m(n). In accordance with the present invention, the compensation signal q(n) in effect nudges the level-shifted signal sequence b(n) towards a value that reduces or cancels the DC value of the adjusted modulo signal m(n).

In accordance with the present invention, in response to the adjusted modulo signal m(n), the DC canceller 340 both generates the compensation signal q(n) and also the output signal p(n). Referring to FIG. 4, the DC canceller 340 comprises a DC compensator 426, an integrator 442/443, a multiplier 428, and an insertion switch 342. The adjusted modulo signal m(n) is an input both to the insertion switch 342 and also to the integrator 442/443. The integrator 442/443 in the preferred embodiment is implemented as a running summer having a summing element 442 and a delay element 443 wherein the output of the integrator 442/443 is a DC signal, such that s(n)=s(n−1)+m(n). As depicted in the flow chart of FIG. 6, for all n less than or equal to $n_f$, the insertion switch 342 sets the value of m(n) as the output p(n).

Figure 7:
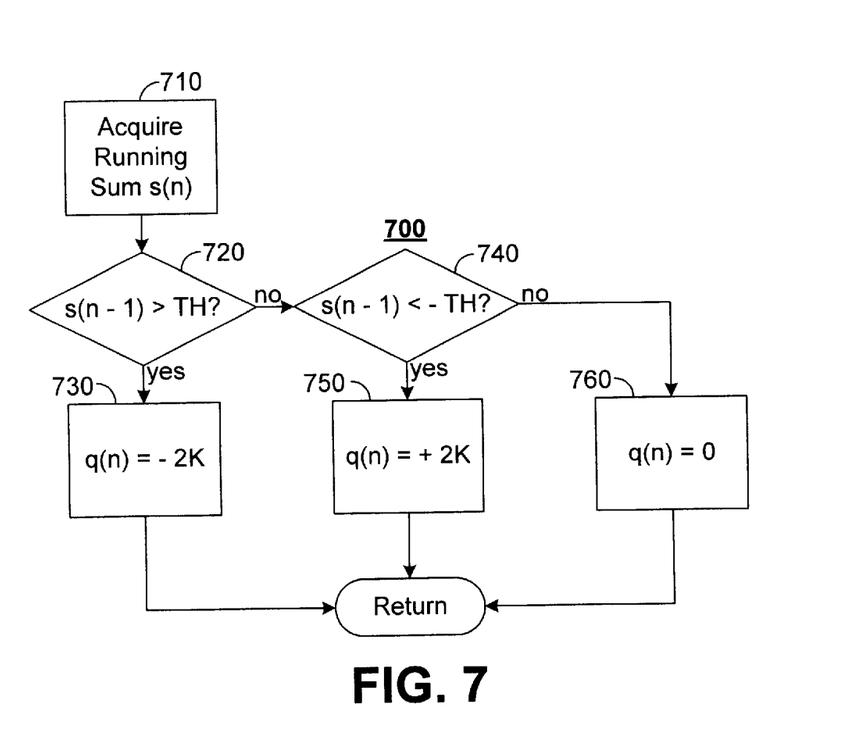
FIG. 7 is a flow chart illustrating details of a DC compensation algorithm in accordance with one embodiment of the present invention.

The running sum output s(n−1) of the integrator 442/443 is provided to the DC compensator 426 and to a multiplier 428. Note that, in the current embodiment, a summer 444 passes the output s(n−1) to the DC compentsaotr 426 without modifying such output. In accordance with the present invention, the DC compensator 426 generates the compensation signal q(n) pursuant to a compensation algorithm, specific details of which are depicted in the flow chart of FIG. 7. Referring to FIG. 7, when the output s(n−1) of the integrator 442/443 has a magnitude having an absolute value that is greater than a preselected threshold value TH, the compensation signal q(n) is comprised of negative or positive values of 2K, which are added to the signal b(n), via summer 408, when s(n−1) is greater than +TH or less than −TH, respectively, as shown by steps 710, 720, 730, 740, and 750 in method 700. Otherwise, the compensation signal q(n) is set to a value of zero, as shown by steps 710, 720, 740 and 760. As a result, at the next sample time, m(n) will have a value that will decrease, or increase, respectively, the magnitude of s(n) at the next sample time.

Figure 8:
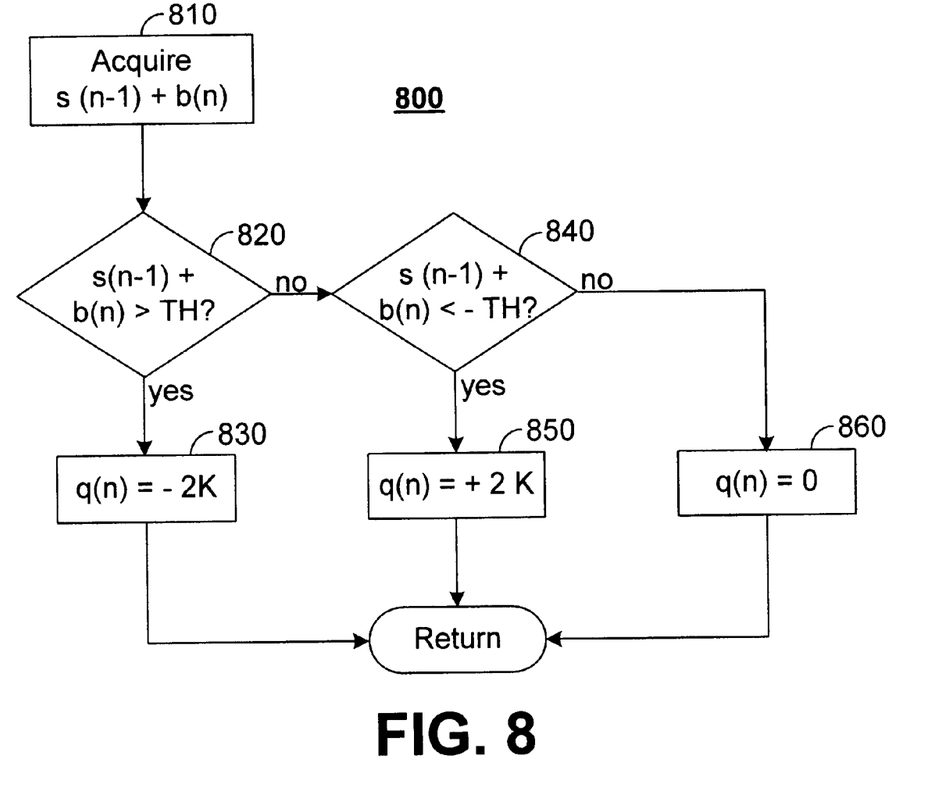
FIG. 8 is a flow chart illustrating details of a DC compensation algorithm in accordance with another embodiment of the present invention.

In accordance with another embodiment of the present invention, the summer 444 adds the signal b(n) to the output s(n−1) to form a combined signal, s(n−1)+b(n), that is provided to the DC compensator 426, as shown by FIG. 4. In such an embodiment, when the output s(n−1)+b(n) of the summer 444 has a magnitude having an absolute value that is greater than a preselected threshold value TH, the compensation signal q(n) is comprised of negative or positive values of 2K, which are added to the signal b(n), via summer 408, when s(n−1)+b(n) is greater than +TH or less than −TH, respectively, as shown by steps 810, 820, 830, 840, and 850 in method 800 (FIG. 8). Otherwise, the compensation signal q(n) is set to a value of zero, as shown by steps 810, 820, 840 and 860.

Figure 5:
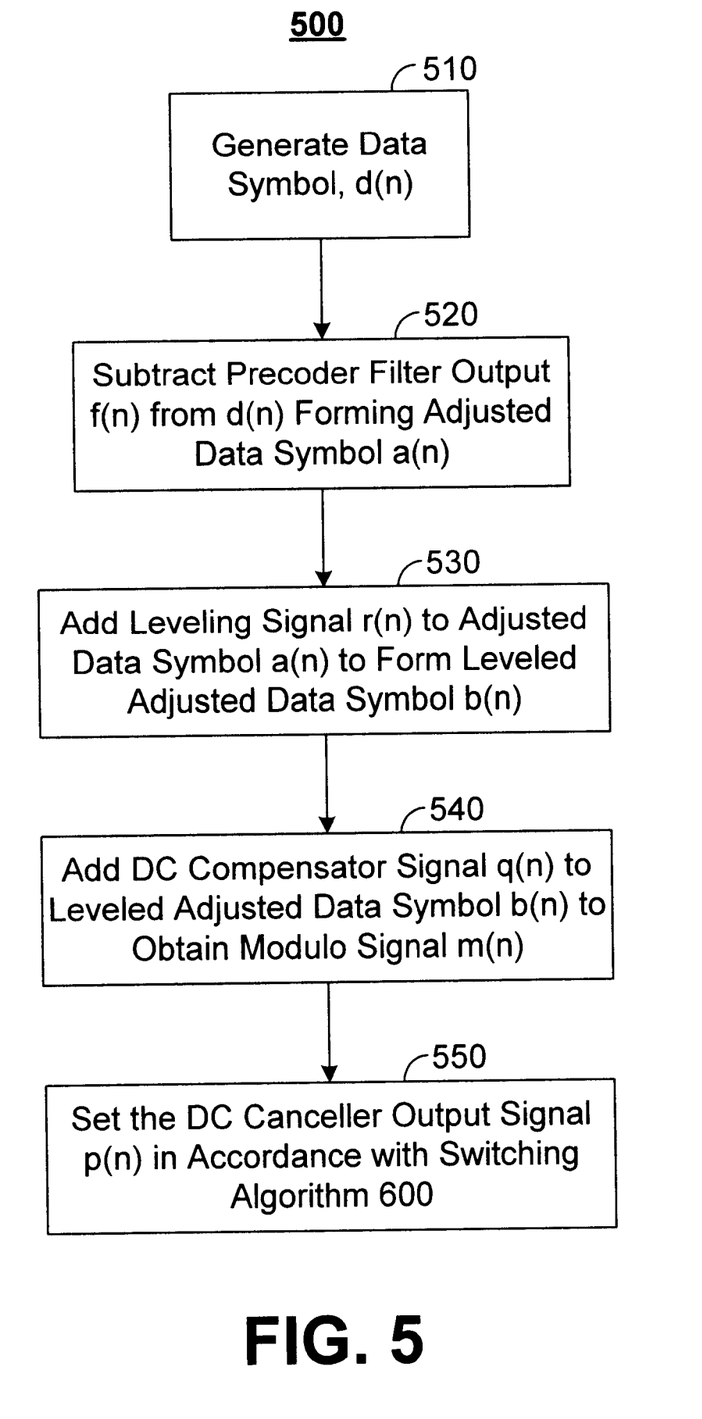
FIG. 5 is a flow chart depicting specific steps of a DC cancellation method in accordance with the present invention.

FIG. 5 shows a flow diagram of a DC cancellation method 500 according to the present invention. The method 500, which is implemented by the apparatus of FIG. 4, includes the steps of: generating a data symbol d(n), step 510; subtracting the output f(n) of a precoder filter from the data symbol d(n) to form an adjusted data symbol a(n), step 520; adding a level shifting signal r(n) to the adjusted data symbol a(n) to form a level-shifted (modulo) data symbol b(n), step 530; adding DC compensation signal q(n) to the data symbol b(n) to obtain a modulo signal m(n), step 540; and setting a DC canceller output signal p(n) in accordance with the switching algorithm described below with reference to FIG. 6, step 550. Preferably, the DC canceller output signal p(n) is set by determining the running sum of the adjusted modulo signal m(n); setting the value of an output signal p(n) as m(n) until a predetermined time after the final data symbol to be transmitted has been transmitted and, then, setting the value of the output signal p(n) as the negative value of the running sum s(n−1) of the adjusted modulo signal m(n).

Figure 11:
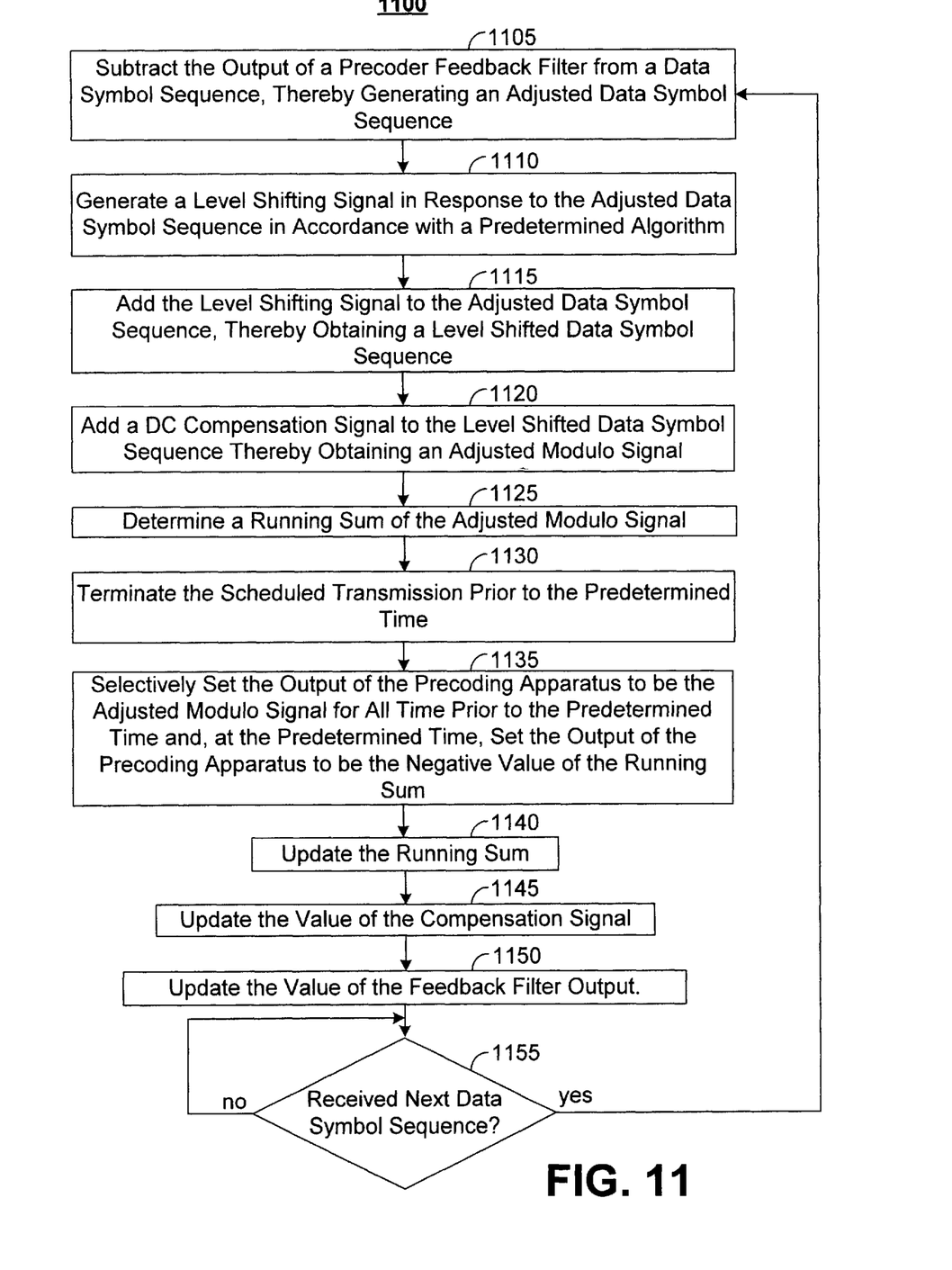
FIG. 11 is a flow chart depicting specific steps of an exemplary DC cancellation method in accordance with the present invention.

FIG. 11 shows a flow diagram of an exemplary DC cancellation method 1100 according to the present invention. The method 1100 includes the steps of: subtracting the output of a precoder feedback filter from the data symbol sequence, thereby generating an adjusted data symbol sequence (step 1105); generating a level shifting signal in response to the adjusted data symbol sequence and in accordance with a predetermined algorithm (step 1110); adding the level shifting signal to the adjusted data symbol sequence, thereby obtaining a level shifted data symbol sequence (step 1115); adding a DC compensation signal to the level shifted data symbol sequence thereby obtaining an adjusted modulo signal (step 1120); determining a running sum of the adjusted modulo signal (step 1125); terminating the scheduled transmission prior to the predetermined time (step 1130); selectively setting the output of the preceding apparatus to be the adjusted modulo signal for all time prior to the predetermined time and, at the predetermined time, setting the output of the precoding apparatus to be the negative value of the running sum (step 1135); updating the running sum( step 1140); updating the value of the compensation signal (step 1145); updating the value of the feedback filter output (step 1150); and returning to step 1105 upon the initiation of the next scheduled transmission of a data symbol sequence (step 1155).

Figure 6:
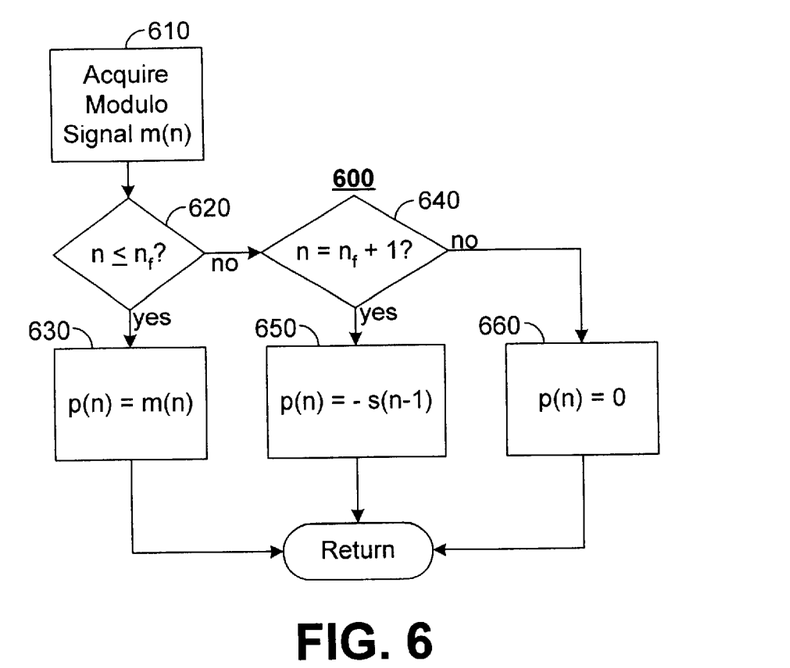
FIG. 6 is a flow chart illustrating details of the switching or signal insertion algorithm of the present invention.

Referring to the method 600 depicted by FIG. 6, in accordance with the present invention, the insertion switch 342 sets p(n) equal to m(n) for all n up to and including the sample time, $n_f$, as shown by blocks 610, 620, and 630. At the next sample time, $n_f+1$, switch 342 sets p(n) equal to the negative value of the output of the integrator 442/443, as shown by blocks 640 and 650. The negative value of the output of the integrator 442/443 is obtained by using multiplier 428 to multiply s(n−1) by minus one. When the negative DC value of s(n−1) is thereby added to the previously accumulated DC value of p(n) for all values of n from −∞ to $n_f$, the resulting summation with the negative DC value of s(n−1) at n equal to $n_f+1$, is zero. As a result of that summation, the DC component of p(n) is driven to zero at sample time $n_f+1$, as indicated by block 660.

The following is a set of equations, and a summary of the notation used in this application, which are pertinent to the preferred embodiments.

The method and apparatus equations, ordered in the sequence of application illustrated in the drawings, are as follows. Values of m(n) and s(n) for t<0 are set at zero. The input signal d(n) is known for all values of n:

1.
$$f(n) = \sum_{j=1}^{LEN(h(n))-1} m(n-j)h(j)$$

where h(j) represents the filter coefficients 2. a(n)=d(n)−f(n)
3.
$$r(n) = -1.0 * floor\left(\frac{a(n)+K}{2K}\right) * 2K.$$

EQS. 3 & 4 are the modulo device, wherein the function, floor (x) is x rounded towards negative infinity. For example 4.5 is rounded to 4, −3.4 is rounded to −4, and 0.78 is rounded to 0.

4. b(n)=a(n)+r(n)
5. q(n)=−2K when s(n−1)>TH q(n)=+2K when s(n−1)<−TH q(n)=0 otherwise.
6. m(n)=b(n)+q(n)
7. s(n)=s(n−1)+m(n)
8. p(n)=m(n) when n<$n_f$ p(n)=−1.0*s(n−1) when n=($n_f+1$) p(n)=m(n)=0 when n≦($n_f+1$)
9. Return to equation 1 when transmitter is active, else follow transceiver off/on protocol.

Further, when b(n) serves as a predictor signal, as shown in FIG. 4, Equation 5 shown above becomes:

q(n)=2K when s(n−1)+b(n)>TH
q(n)=2K when s(n−1)+b(n)<−TH
q(n)=0 otherwise.

A list of terms used to describe the present invention is also provided:

d(n)—data symbol, a symbol value generated in a modulator using SC-PAM, or equivalents;
a(n)—adjusted data symbol, the value of the data symbol when adjusted by a precoder filter signal;
f(n)—precoder filter signal, the output of the precoder filter;
r(n)—level shifting signal, a signal that forces the magnitude of a(n) between −K and +K;
b(n)—level shifted data symbol sequence (modulo signal), the adjusted signal a(n) level shifted by r(n);
s(n)—running sum, the output of an integrator;
m(n)—adjusted modulo signal, the signal compensated by the level shifter and the DC compensator;
p(n)—the output of the DC Canceller supplied to the transmitter circuits;
q(n)—compensator signal, the output signal of the DC Canceller supplied to the precoder;
n—time index for digital symbols;
$n_f$—the time index value for the final symbol to be transmitted;
$n_f+1$—an example of a time index value corresponding to the predetermined time at which the DC component of p(n) is driven to zero;
K—the magnitude of the lower and upper limits of a modulo device; and
TH—a threshold value, a predetermined constant that is a design parameter.

From the foregoing, it will be observed that numerous variations and modifications within the skill of the telecommunications art may be effected without departing from the spirit and scope of the invention. It is to be understood that no limitation with respect to the specific methods and apparatus illustrated herein is intended nor should be inferred. It is, of course, intended to cover by the appended claims all such modifications as fall within the scope of the claims. The invention is further defined by the following claims:

What is claimed is:

1. A precoding apparatus in a transmitter of a data communication system, said precoding apparatus having a data symbol sequence as an input and having a precoded data symbol sequence as an output, said precoding apparatus comprising:

a modulo device for receiving an adjusted data symbol sequence that is based on said input data symbol sequence and for generating a modulo signal; and a circuit coupled to said modulo device for driving the DC output of said precoding apparatus to zero at a predetermined time, said circuit comprising:

a compensator summer for adding said modulo signal and a compensation signal thereby obtaining an adjusted modulo signal;

a compensator means for generating said compensation signal, said compensator means incorporating an integrator for obtaining a running sum of said adjusted modulo signal; and an insertion switch programmed to selectively set the output of said precoding apparatus to be said adjusted modulo signal prior to said predetermined time and, at said predetermined time, to set said output of the precoding apparatus to be the negative value of said running sum.

2. A precoding apparatus in a transmitter of a data communication system, said precoding apparatus having a data symbol sequence as an input and having a precoded data symbol sequence as an output, said precoding apparatus comprising:

a feedback filter and a filter summer for subtracting the output of said feedback filter from said input data symbol sequence thereby obtaining an adjusted data symbol sequence;

a level shifter responsive to said adjusted data symbol sequence for generating a level shifting signal;

a modulo summer for adding said level shifting signal to said adjusted data symbol sequence thereby outputting a modulo signal; and a circuit coupled to said modulo summer for driving the DC output of said precoding apparatus to zero at a predetermined time, said circuit comprising:

a compensator summer for adding the output of said modulo summer and a compensation signal thereby obtaining an adjusted modulo signal;

a compensator means for generating said compensation signal, said compensator means incorporating an integrator for obtaining a running sum of said adjusted modulo signal; and an insertion switch programmed to selectively set the output of said precoding apparatus to be said adjusted modulo signal prior to said predetermined time and, at said predetermined time, to set said output of the precoding apparatus to be the negative value of said running sum.

3. A method for driving the DC output of a precoding apparatus in a transmitter of a data communication system to zero at a predetermined time after a scheduled transmission, said precoding apparatus having a data symbol sequence as an input and having a precoded data symbol sequence as an output, said method comprising the steps of:

a. subtracting the output of a precoder feedback filter from said data symbol sequence, thereby generating an adjusted data symbol sequence;

b. generating a level shifting signal in response to said adjusted data symbol sequence and in accordance with a predetermined algorithm;

c. adding said level shifting signal to said adjusted data symbol sequence, thereby obtaining a level shifted data symbol sequence;

d. adding a DC compensation signal to said level shifted data symbol sequence thereby obtaining an adjusted modulo signal;

e. determining a running sum of said adjusted modulo signal;

f. terminating said scheduled transmission prior to said predetermined time;

g. selectively setting the output of said precoding apparatus to be said adjusted modulo signal for all time prior to said predetermined time and, at said predetermined time, setting said output of the precoding apparatus to be the negative value of said running sum;

h. updating said running sum;

i. updating the value of said compensation signal;

j. updating the value of said feedback filter output; and k. returning to step a upon the initiation of the next scheduled transmission of a data symbol sequence.

4. The method of claim 3 wherein step b additionally comprises the steps of:

b1. adding a predetermined constant, K, to said adjusted data symbol sequence;

b2. dividing the value of the adjusted data symbol sequence obtained in step, b1, by the quantity +2K;

b3. rounding the quotient obtained in the preceding step, b2, towards negative infinity; and b4. multiplying the result obtained in the preceding rounding step, b3, by the quantity −2K, thereby generating said level shifting signal.

5. The method of claim 3 wherein step d additionally comprises the steps of:

d1. setting the value of said compensation signal to a value equal to −2K, where K is a preselected constant, when the value of said running sum is greater than a preselected threshold value, +TH;

d2. setting the value of said compensation signal to a value equal to +2K, when the value of said running sum is less than −TH; and d3. setting the value of said compensation signal to a value of zero, when the value of said running sum is within the range from −TH to +TH.

6. The method of claim 3 wherein step d additionally comprises the steps of:

d1. setting the value of said compensation signal to a value equal to −2K, where K is a preselected constant, when the combined value of said running sum and said level shifted data symbol sequence is greater than a preselected threshold value, +TH;

d2. setting the value of said compensation signal to a value equal to +2K, when the combined value of said running sum and said level shifted data symbol sequence is less than −TH; and d3. setting the value of said compensation signal to a value of zero, when the combined value of said running sum and said level shifted data symbol sequence is within the range from −TH to +TH.

7. A method for driving the DC output of a precoding apparatus in a transmitter of a data communication system to zero at a predetermined time after a scheduled transmission, said precoding apparatus having a data symbol sequence as an input and having a precoded data symbol sequence as an output, said method comprising the steps of:

a. performing a modulo operation upon said input data symbol sequence;

b. adding a DC compensation signal to the data symbol sequence resulting from said modulo operation thereby obtaining an adjusted modulo signal;

c. determining a running sum of said adjusted modulo signal;

d. terminating said scheduled transmission prior to said predetermined time; and thereafter e. selectively setting the output of said precoding apparatus to be said adjusted modulo signal for all time prior to said predetermined time and, at said predetermined time, setting said output of said precoding apparatus to be the negative value of said running sum;

f. updating said running sum;

g. updating the value of said compensation signal; and h. returning to step a upon the initiation of the next scheduled transmission of a data symbol sequence.

8. The method of claim 7 wherein step b additionally comprises the steps of:

b1. setting the value of said compensation signal to a value equal to −2K, where K is a preselected constant, when the value of said running sum is greater than a preselected threshold value, +TH;

b2. setting the value of said compensation signal to a value equal to +2K, when the value of said running sum is less than −TH; and b3. setting the value of said compensation signal to a value of zero, when the value of said running sum is within the range from −TH to +TH.

9. In a time division duplex data communication system, a method for driving the DC output of a precoding apparatus to zero at a predetermined time after a scheduled transmission, said precoding apparatus having a data symbol sequence as an input and having a precoded data symbol sequence as an output, said method characterized by the steps of:

a. performing a modulo operation upon said input data symbol sequence;

b. adding a DC compensation signal to the data symbol sequence resulting from said modulo operation thereby obtaining an adjusted modulo signal;

c. determining a running sum of said adjusted modulo signal;

d. terminating said scheduled transmission prior to said predetermined time; and thereafter e. selectively setting the output of said precoding apparatus to be said adjusted modulo signal for all time prior to said predetermined time and, at said predetermined time, setting said output of said precoding apparatus to be the negative value of said running sum; .

f. updating said running sum;

g. updating the value of said compensation signal, and h. returning to step a upon the initiation of the next scheduled transmission of a data symbol sequence.

10. The method of claim 9 wherein step b additionally comprises the steps of:

b1. setting the value of said compensation signal to a value equal to −2K, where K is a preselected constant, when the value of said running sum is greater than a preselected threshold value, +TH;

b2. setting the value of said compensation signal to a value equal to +2K, when the value of said running sum is less than −TH; and b3. setting the value of said compensation signal to a value of zero, when the value of said running sum is within the range from −TH to +TH.

11. In a precoding apparatus in a transmitter of a time division duplex data communication system, said precoding apparatus having a data symbol sequence as an input and having a precoded data symbol sequence as an output, said precoding apparatus comprising a modulo device for receiving an adjusted data symbol sequence that is based on said input data symbol sequence and for generating a modulo signal, the improvement characterized by a circuit for driving the DC output of said precoding apparatus to zero at a predetermined time, said circuit comprising:

a compensator summer for adding said modulo signal and a compensation signal thereby obtaining an adjusted modulo signal;

a compensator means for generating said compensation signal, said compensator means incorporating an integrator for obtaining a running sum of said adjusted modulo signal; and an insertion switch programmed to selectively set the output of said precoding apparatus to be said adjusted modulo signal prior to said predetermined time and, at said predetermined time, to set said output of the precoding apparatus to be the negative value of said running sum.

12. In a precoding apparatus in a transmitter of a time division duplex data communication system, said precoding apparatus having a data symbol sequence as an input and having a precoded data symbol sequence as an output, said precoding apparatus comprising a feedback filter and a filter summer for subtracting the output of said feedback filter from said input data symbol sequence thereby obtaining an adjusted data symbol sequence; a level shifter responsive to said adjusted data symbol sequence for generating a level shifting signal; and a modulo summer for adding said level shifting signal to said adjusted data symbol sequence thereby obtaining a level shifted data symbol sequence; the improvement characterized by a circuit for driving the DC output of said precoding apparatus to zero at a predetermined time, said circuit comprising:

a compensator summer for adding said level shifted data symbol sequence and a compensation signal thereby obtaining an adjusted modulo signal;

a compensator means for generating said compensation signal, said compensator means incorporating an integrator for obtaining a running sum of said adjusted modulo signal; and an insertion switch programmed to selectively set the output of said precoding apparatus to be said adjusted modulo signal prior to said predetermined time and, at said predetermined time, to set said output of the precoding apparatus to be the negative value of said running sum.

13. A method for driving the DC output of a precoding apparatus in a data communication system to zero at a predetermined time after a scheduled transmission of data, the method comprising the steps of:

a. generating a data symbol sequence d(n);

b. subtracting the output f(n) of a precoder filter from the data symbol sequence d(n) to form an adjusted data symbol sequence a(n);

c. adding a level shifting signal r(n) to the adjusted data symbol a(n) to form a level shifted (modulo) data symbol sequence b(n);

d. adding a DC compensation signal q(n) to the level shifted data symbol sequence b(n) to obtain an adjusted modulo signal m(n);

e. determining a running sun s(n) of the adjusted modulo signal m(n);

f. setting the value of an output signal p(n) to the value of the adjusted modulo signal m(n) until said predetermined time; and g. setting the value of the output signal p(n) to the negative value of the running sum s(n−1) at said predetermined time.

14. The method of claim 13 wherein step c additionally comprises the steps of:

c1. adding a predetermined constant, K, to said adjusted symbol sequence c2. dividing the value of the adjusted data symbol sequence obtained in, c1, by the quantity +2K;

c3. rounding the quotient obtained in the preceding step, c2, towards negative infinity; and c4. multiplying the result obtained in the preceding rounding step, c3, by the quantity −2K, thereby generating said level shifting signal.

15. The method of claim 13 wherein step e additionally comprises the steps of:

e1. setting the value of said compensation signal to a value equal to −2K, where K is a preselected constant, when the value of said running sum is greater than a preselected threshold value, +TH;

e2. setting the value of said compensation signal to a value equal to +2K, when the value of said running sum is less than −TH; and e3. setting the value of said compensation signal to a value of zero, when the value of said running sum is within the range from −TH to +TH.

16. The method of claim 13 wherein step e additionally comprises the steps of:

e1. setting the value of said compensation signal to a value equal to −2K, where K is a preselected constant, when the combined value of said running sum and said level shifted data symbol sequence is greater than a preselected threshold value, +TH;

e2. setting the value of said compensation signal to a value equal to +2K, when the combined value of said running sum and said level shifted data symbol sequence is less than −TH; and e3. setting the value of said compensation signal to a value of zero, when the combined value of said running sum and said level shifted data symbol sequence is within the range from −TH to +TH.

* * * * *